Nov. 15, 1927.
W. F. BUTLER
CAN TESTER
Filed Jan. 22, 1921
1,649,287
2 Sheets-Sheet 1
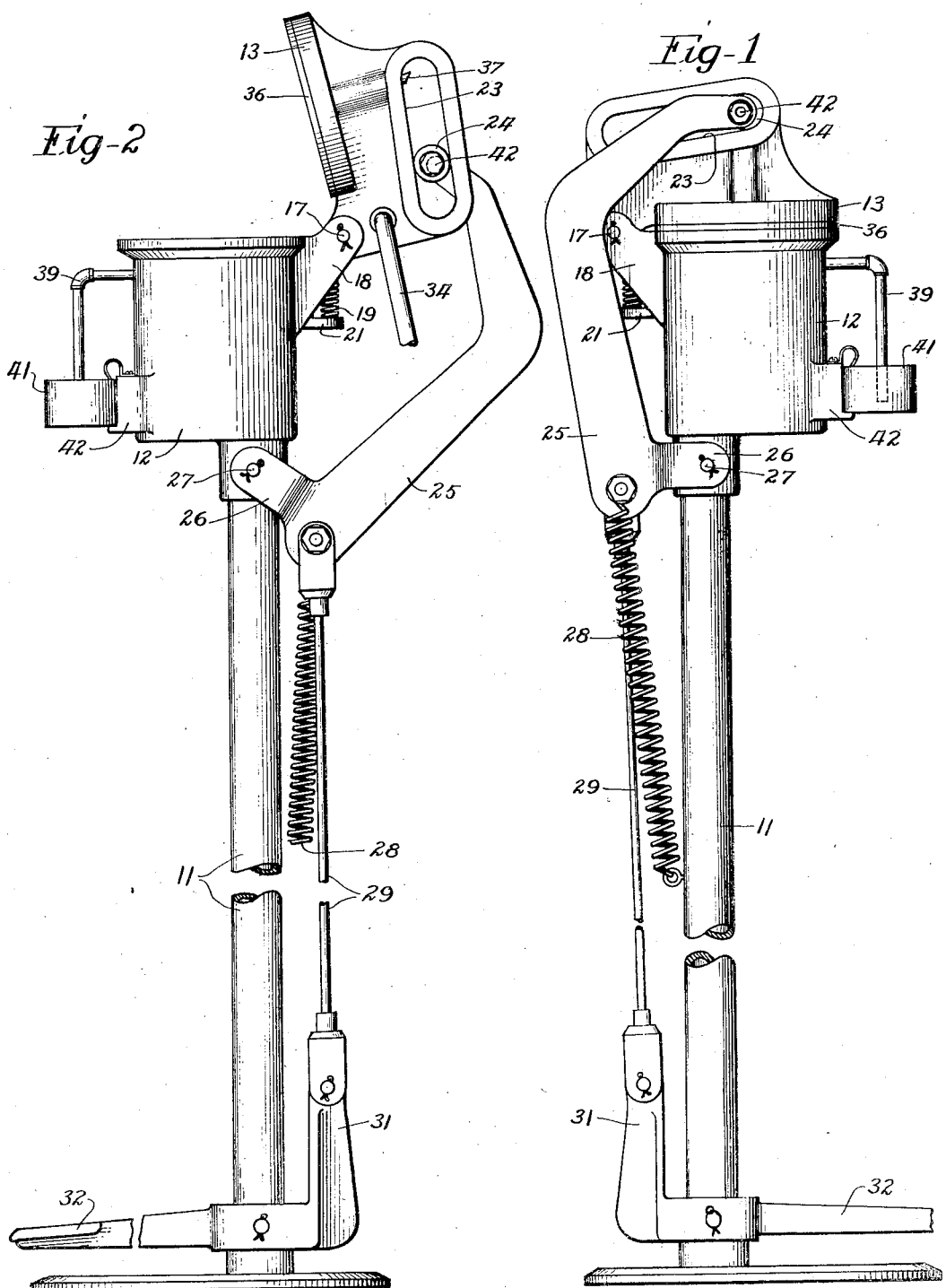

Nov. 15, 1927.
W. F. BUTLER
1,649,287
CAN TESTER
Filed Jan. 22, 1921  2 Sheets-Sheet 2
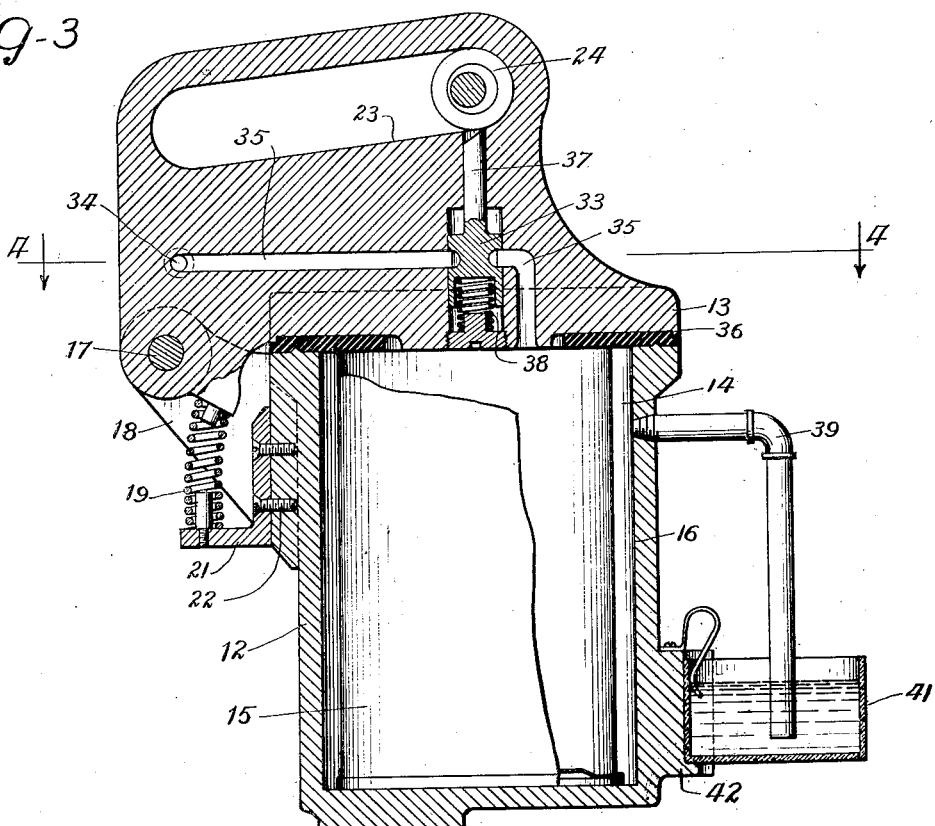
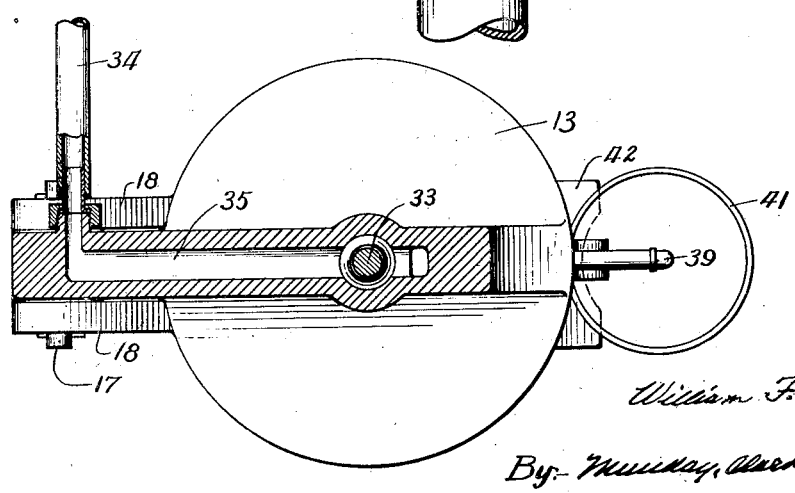
Inventor
William F. Butler
By Munday, Clarke & Carpenter Atty's Patented Nov. 15, 1927.

1,649,287

UNITED STATES PATENT OFFICE.

WILLIAM F. BUTLER, OF HILLSIDE, NEW JERSEY, ASSIGNOR TO AMERICAN CAN COMPANY, OF NEW YORK, N. Y., A CORPORATION OF NEW JERSEY.

CAN TESTER.

Application filed January 22, 1921. Serial No. 439,063.

This invention relates in general to can testers and more particularly to a device for retesting cans taken at random from the outlet of a factory line tester, in order to ascertain whether or not such line tester is functioning properly.

In order to comprehend the objects and advantages of the invention it should be realized that in the manufacture of cans they are subjected to a test which is accomplished by means of a tester positioned in the line of production of the cans. In one form of testing machine there is provided a balance between the pressure under which the can is tested and the pressure which flows through the line of the cans. This balance is controlled by means of a valve and, normally, is maintained with sufficient exactness to insure operation of the sensitive detector employed to discover leaks. If, however, for any reason, this balance should be disturbed, the detector would be prevented from operating with its normal efficiency and cans might be passed through the machine as perfect when in fact they contained small leaks.

In order to check against the operation of these testers and to quickly detect any change in their normal operation, it is the practice to have an operator, equipped with a small retesting machine, stationed at the outlet of the tester, to retest some of the cans taken at random from the supposedly good ones.

The types of retesting machines heretofore employed have usually been those wherein the cans are immersed in water and it has been necessary to pass the cans thus retested through a drier before shipment or placing in storage. When the regular line tester is a dry machine, as is normally the case, it is an extra and somewhat expensive operation to run the retested cans, which have been wet by said water, through a drier.

It is therefore a principal object of the present invention to provide a dry retesting machine which obviates the necessity of drying the retested cans.

A further object of the invention is the provision of a device of this nature which is highly sensitive and sure in operation, so that it may unfailingly detect very slight leaks.

A still further object of the invention is the provision of such a device, which is easily and quickly operable with a minimum of effort by the operator.

Another object of the invention is the provision of a retesting device of simple construction and of few parts, being, therefore, dependable in action and unlikely to require frequent repair or replacement of parts.

A further and important object of the invention is the provision of a method of testing cans which may be used in the first instance as a regular testing process, as well as for the retesting purpose heretofore stated.

Numerous other objects and advantages of the invention will be apparent as it is better understood from the following description when considered in connection with the accompanying drawings illustrating a preferred embodiment thereof.

Referring to the drawings,

Figure 1 is a side elevation of a device embodying my invention;

Fig. 2 is a side elevation of the opened device taken from the opposite side;

Fig. 3 is an enlarged vertical section of the upper part of the device; and

Fig. 4 is a transverse section taken substantially on the line 4—4 in Fig. 3.

On the drawings which illustrate an embodiment of the invention, it will be noted that the device is supported upon a pedestal support 11 of suitable height to render it accessible to a standing operator. Secured to the top of the support 11 is a chamber 12 adapted to be closed by a cover or clamping head 13. The chamber is of sufficient size to permit the seating therein of a can to be tested and to provide air space 14 between the wall of the can 15 and the interior of the chamber wall 16. The cover 13 is pivotally secured by a pin 17 to two supporting brackets 18 protruding from the wall of the chamber 12.

A spring 19 is attached at one end to the cover and at the other to an arm 21 attached, by means of screws 22, to the chamber wall. This spring assists in maintaining the cover or head in open position. In the top of the head is a cam slot 23, in which a cam roll 24, carried on a lever 25, moves during the opening and closing operations. The cam lever 25 has a forked extension 26 which is pivotally connected by means of a pin 27 to a lower extension of the chamber 12, which fits upon the supporting member 11. A spring 28 normally holds the lower end of the lever 25 in down position, whereby the head is kept open. The lever 25 is connected by means of a connecting rod 29 to an upward extension 31 of a pedal or foot lever 32.

In operation, the can to be tested is placed in the chamber, as indicated in Fig. 3. The operator then presses down the pedal or foot lever 32 which forces the head to closed position. As may be seen by reference to Fig. 3, the clamping head 13 contains an air-valve 33 controlling the passage of air fed from a hose connection 34 through an air passage 35 leading to the interior of the can 15. A sealing pad 36 upon the cover serves to seal the air chamber and the enclosed can.

Upon the closing of the head, the cam roll 24 depresses a valve member 37, thereby compressing a spring 38, which, normally, holds the valve in upper closed position, and opens the valve. Air under pressure is then admitted to the sealed can.

Suitable air-escape indicating means are provided communicating with the interior of said chamber at a point outside of the can body. In my drawings I have illustrated the following:

A communicable connection 39 leads from the interior of the chamber to a cup of water 41 secured in a bracket support 42 on the side of the chamber. The air in the space 14 is balanced with that outside the chamber, and in case the can is defective, the forcing of air into it when sealed will result in the escape of sufficient air to disturb the balance in the space 14, whereupon bubbles will appear in the water in the cup 41. In this way, leaky cans may be detected and the line tester corrected if it be thus proved to be faulty.

If the cans are found to contain no leaks, they may be tossed back into the line and no extra operation is required in preparing them for shipment or storage.

After the test is completed, the operator may allow the foot lever 32 to be raised by the spring 28, and as soon as the roll 24 starts back in the slot 23 the valve 33 will be allowed to close, shutting off the air feed. Further movement of the lever 25 will release the cover and lift it to open position, it then being ready for the next operation.

It will be noted that the roll 24 is carried on an eccentric pin 42, whereby the tightness of the sealing pad 36 against the top of the chamber and the can may be adjusted and a proper seal insured while the can is being tested.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device for testing cans and the like, comprising an air chamber in which a can may be seated and sealed, a clamping head adapted to close upon and seal said chamber and can, and means in said clamping head for admitting air under pressure to the temporarily sealed can, and air escape indicating means communicating with the interior of said air chamber.

2. A device for testing cans and the like, comprising a sealable air chamber of greater circumferential dimension than the can to be tested, a manually operated clamping head adapted to seal said chamber and an included can, means for admitting air under pressure to the sealed can, and air escape indicating means communicating with the interior of said air chamber.

3. A device for testing cans and the like, comprising an air chamber in which a can of smaller dimension may be seated, a clamping head operable to seal said chamber and can, means admitting air under pressure through said clamping head to the sealed can, air-escape indicating means communicating with the interior of said air chamber, and common means for operating said clamping head and air admitting means.

4. A device for retesting cans and the like in a factory line, comprising an air chamber in which a can may be seated and sealed, a clamping head adapted to seal said chamber and can, a pressure air feed in the clamping head for admitting air under pressure to the sealed can, and air-escape indicating means communicating with the interior of said air-chamber.

5. A dry can retesting device, comprising an air chamber of greater internal dimension than the can to be tested, means in said chamber for sealing a can therein, means for feeding air under pressure into a sealed can in said chamber, a container provided with testing liquid, and means for conducting air escaping through a defective can from said chamber into the testing liquid in said container.

6. In a device for testing cans and the like, an air chamber, a clamping head adapted to seal said chamber and an included can, said clamping head comprising a sealing pad and a body portion and having therein an air feed passage and a valve controlling the same, for admitting air under pressure to the sealed can and means for opening and closing the head, said means also controlling said valve.

7. In a device for testing cans and the like, means for feeding air under pressure to the can to be tested, said means including a clamping head, an air valve therein, and a cam roll movable in said clamping head to open the valve when the head is in closed position.

8. A device for testing cans and the like, comprising a chamber in which a can may be seated and sealed, said chamber being of greater circumferential dimension than said can, a clamping head operable to seal said chamber and can, an air valve and feed passage in said clamping head, and means manually operable to close the clamping head upon said chamber, said means automatically opening the air valve as the clamping head reaches closed position.

9. In a device for testing cans and the like, a pressure air feed comprising an air pressure connection communicating with the interior of said device, a valve in said connection, a spring for holding said valve in closed position to obstruct said connection, means for closing said device, and means operable upon the closing of the device to actuate the valve and open said connection, whereby air is admitted to a sealed can.

10. The method of testing cans, comprising placing the can to be tested in a sealable air chamber, sealing said chamber, feeding air under pressure to the sealed can and conducting any air escaping from a defective can into the surrounding air space within the chamber to a body of water.

11. A can testing device, comprising means for enclosing a can in an air space, means for introducing air under pressure into the enclosed can, a container having a body of liquid therein, and means for conducting air from said air space into said body of liquid below the surface of the liquid.

12. A can testing device, comprising means for enclosing a can under atmospheric air pressure, means for introducing air under pressure above atmospheric into the enclosed can, and means for indicating increase in pressure in said air space.

WILLIAM F. BUTLER.